(12) United States Patent
Malreddy et al.

(10) Patent No.: US 9,107,047 B1
(45) Date of Patent: Aug. 11, 2015

(54) METHOD AND SYSTEM FOR BASE STATION REPEAT PAGING

(71) Applicant: Sprint Spectrum L.P., Overland Park, KS (US)

(72) Inventors: Murali Malreddy, Overland Park, KS (US); Ryan S. Talley, Overland Park, KS (US); Khalid M. Medhat, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/258,603

(22) Filed: Apr. 22, 2014

(51) Int. Cl.
*H04W 68/00* (2009.01)
*H04W 4/06* (2009.01)

(52) U.S. Cl.
CPC ........................................ *H04W 4/06* (2013.01)

(58) Field of Classification Search
USPC ......................................... 455/458, 466, 453
See application file for complete search history.

(56) References Cited

U.S. PATENT DOCUMENTS

| | | | |
|---|---|---|---|
| 5,826,173 A | 10/1998 | Dent | |
| 5,862,484 A | 1/1999 | Lee | |
| 5,918,174 A | 6/1999 | Chennakeshu et al. | |
| 5,924,042 A | 7/1999 | Sakamoto et al. | |
| 5,940,431 A | 8/1999 | Haartsen et al. | |
| 6,678,258 B1 | 1/2004 | Capurka et al. | |
| 6,823,173 B2 | 11/2004 | Srey et al. | |
| 7,340,251 B1 * | 3/2008 | McClure | 455/434 |
| 7,898,983 B2 | 3/2011 | Laroia et al. | |
| 7,983,696 B1 | 7/2011 | Manghat et al. | |
| 8,271,000 B1 | 9/2012 | Khanka et al. | |
| 8,938,266 B1 * | 1/2015 | Goyal et al. | 455/458 |
| 2003/0003912 A1 | 1/2003 | Melpignano et al. | |
| 2003/0152049 A1 | 8/2003 | Turner | |
| 2005/0186973 A1 | 8/2005 | Gaal et al. | |
| 2005/0215272 A1 | 9/2005 | Helferich | |
| 2008/0248817 A1 | 10/2008 | Gao et al. | |
| 2009/0017845 A1 | 1/2009 | Wu et al. | |
| 2013/0237257 A1 * | 9/2013 | Walke et al. | 455/458 |

FOREIGN PATENT DOCUMENTS

| | | |
|---|---|---|
| WO | WO01/10146 | 8/2001 |
| WO | WO0180588 A1 | 10/2001 |

OTHER PUBLICATIONS

U.S. Appl. No. 13/592,964, filed Aug. 23, 2012.

* cited by examiner

*Primary Examiner* — Brandon Miller

(57) ABSTRACT

Disclosed are a method, apparatus, and system for managing repeat-paging processes within a radio access network. When a base station receives a paging directive, the base station begins broadcasting a first series of page messages destined to a mobile station. Responsive to the first base station receiving no response from the mobile station to the first series of page messages and responsive to the mobile station determining a load state and/or an application type, the first base station decides to send a repeat-paging directive from the first base station to a second base station without routing the repeat-paging directive through the control node or rather to route the repeat-paging directive through the control node and then to the second base station. The repeat-paging directive directs the second base station to begin broadcasting a second series of page messages destined to the mobile station.

20 Claims, 4 Drawing Sheets

METHOD AND SYSTEM FOR BASE STATION REPEAT PAGING

BACKGROUND

In a typical cellular radio access network (RAN), an area is divided geographically into a number of coverage areas or regions (namely, cells and cell sectors). The coverage areas are defined by radio frequency (RF) radiation patterns from base stations (for example, eNodeBs and base transceiver stations (BTSs)). The base stations in a region may be communicatively linked with a control node that manages certain operations of the base stations and that may function generally as an aggregation point for communications passing through the base stations. The control node may also provide or facilitate connectivity and/or communication with a transport network such as the public switched telephone network (PSTN) or the Internet. Generally, the control node may include one or more components communicatively linked to each other, for example, mobility management entities (MMEs), serving gateways (S-GWs), packet gateways (P-GWs), RAN controllers, mobile switching centers (MSCs), and packet data serving nodes (PDSNs). Other examples are possible as well.

When a mobile station (such as a cellular telephone, pager, or appropriately equipped portable computer, for instance) is positioned in a coverage area of such a network, the mobile station communicates via an RF air interface with base station antennas that radiate to define the coverage area. Consequently, a communication path may be established between the mobile station and the transport network, via the air interface, the base station, and the control node.

In practice, communications over the air interface between a base station and a mobile station will comply with a defined air interface protocol or access technology. Numerous such protocols are well known in the art, and others will be developed in the future. Examples of existing protocols include CDMA (e.g., 1xRTT, 1xEV-DO), Long-Term Evolution (LTE), WiMax, iDEN, TDMA, AMPS, GSM, GPRS, UMTS, EDGE, microwave, satellite, MMDS, Wi-Fi, and Bluetooth.

In general, when the control node encounters a trigger event that indicates a need to transmit information to a given mobile station, the control node may cause one or more base stations to page the mobile station. For instance, the control node may initiate paging in the coverage area where the mobile station was last registered and in one or more coverage areas surrounding that coverage area, out to a particular radius that defines a paging area. If the mobile station responds to the page, then the control node would thereby identify the coverage area in which the mobile station is currently operating, and the control node may arrange for transmission of the information to the mobile station in that coverage area.

In each wireless coverage area, the air interface defined by the serving base station may be divided into various discrete channels by applying one or more mechanisms, such as unique spread-spectrum coding, time division multiplexing, and/or frequency differentiation, for instance. One or more of the channels in each coverage area may be reserved for use as a paging channel, on which the base station may broadcast page messages destined to particular mobile stations. And one or more of the channels in each coverage area may be reserved for use as an access channel, on which mobile stations may transmit page response messages to the base station. In practice, when a base station receives from a control node a directive to page a mobile station, the base station may responsively broadcast on the paging channel a page message directed to that mobile station. If and when the mobile station receives the page message, the mobile station may then programmatically transmit a page response message to the base station on the access channel.

OVERVIEW

In some scenarios, when a control node detects a paging trigger for paging a mobile station, the control node responsively directs a first base station (or a set of first base stations) to begin wirelessly broadcasting an initial or first series of page messages destined to the mobile station. If the first base station or control node receives a response from the mobile station to the first series of page messages, the first base station can discontinue broadcasting the page messages, and a communication path can be established between the mobile station and a transport network, such as the PSTN or the Internet. However, if the first base station or control node does not receive a response from the mobile station within a defined period, the control node may direct a second base station (or some other set of base stations—possibly covering a larger area) to broadcast a series of repeat-page messages to page the mobile station. The control node may repeat this process a defined number of times, perhaps while systematically expanding the paging area, before the control node concludes that the mobile station could not be found and declares the paging effort to have failed.

When the control node processes both new paging requests and repeat-paging requests, the resulting backhaul traffic between the control node and each base station to which the control node sends paging directives can be excessive. Further, when the control node processes new paging requests and repeat-paging requests while systematically expanding the paging area, the computational load and/or the signaling load of the control node can increase. Both the increased backhaul traffic between the control node and the base stations and the increased load of the control node can impact overall system performance and hence user experience.

To avoid overwhelming backhaul channels with such traffic, in accordance with the present disclosure, the repeat-page message transmission by the second base station may be triggered by the first base station sending a repeat-paging directive to the second base station without routing the repeat-paging directive through the control node. In one example, the repeat-paging directive is sent from the first base station to the second base station, which the first base station selects from a neighbor list managed by the first base station. The neighbor list includes information relating to one or more other base stations that are arranged to radiate to define one or more coverage areas neighboring a coverage area defined by the first base station. This neighbor list can be automatically or periodically updated based on dynamic conditions of the RAN. Thus, the neighbor list can be used to intelligently increase the paging area in accordance with changing network conditions.

In addition, the first base station can consider a computational and/or signaling load state of the control node to determine whether to route a repeat-paging directive through the control node or to route the repeat-paging directive to the second base station without routing the repeat-paging directive through the control node. For example, if the control node is currently experiencing a high load that is above a determined threshold, the first base station can decide to route the repeat-paging directive to the second base station without routing the repeat-paging directive through the control node. However, if the control node is currently experiencing a low load that is below the determined threshold, the first base station can decide to route the repeat-paging directive through the control node, and the control node can then control the transmission of repeat-paging directives to other base stations.

Further, the first base station can also determine whether to route a repeat-paging directive through the control node or to route the repeat-paging directive directly to the second base station by considering a characteristic of the trigger event that caused the first base station to page the mobile station. For example, the characteristic of the trigger event can be a communication or application type related to the information that is to be transmitted to the mobile station. The application type of the information can be associated with a priority or latency level. In one embodiment, if the application type is associated with a threshold low latency or a threshold high priority, the first base station can route the repeat-paging directive to the second base station without routing the repeat-paging directive through the control node. However, if the application type is associated with a threshold high latency or a threshold low priority, the first base station can route the repeat-paging directive through the control node, and the control node can then control the transmission of repeat-paging directives to other base stations.

By having the first base station send the repeat-paging directive to the second base station in response to determining the load state of the control node and/or the application type of the information that is to be transmitted to the mobile station, the repeat-paging function may advantageously be handled by the base stations without unnecessarily burdening the control node. This disclosed arrangement may thus allow the control node to process more new paging requests per second, as compared to arrangements where the control node processes both new paging requests and repeat-paging requests. This disclosed arrangement may also reduce capital expenses associated with maintaining additional control node capacity and backhaul capacity to support processing of both new paging requests and repeat-paging requests. Further, repeat-paging directives associated with certain information (e.g., high priority information or low latency information that is to be communicated relatively quickly) can be directly routed from one base station to another base station so as to more quickly establish a communication path with a target mobile station.

In accordance with one aspect of the present disclosure, a method for paging a mobile station in a cellular radio access network includes wirelessly broadcasting from a first base station a first series of page messages destined to the mobile station. Broadcasting the first series of page messages is performed in response to the first base station receiving a paging directive from a control node. The method also includes determining, by the first base station, a load state of the control node and, responsive to the first base station receiving no response from the mobile station within a defined period after broadcasting the first series of page messages and responsive to determining the load state of the control node, the first base station deciding whether to send a repeat-paging directive from the first base station to a second base station without routing the repeat-paging directive through the control node or rather to route the repeat-paging directive through the control node and then to the second base station. The repeat-paging directive directs the second base station to wirelessly broadcast a second series of page messages destined to the mobile station.

In accordance with another aspect of the present disclosure, a paging system includes a control node, a first base station, and a second base station. Each base station is configured to radiate to define at least one respective wireless coverage area for serving mobile stations. Further, the control node, the first base station, and the second base station are communicatively linked with each other. The control node is configured to (i) detect a paging trigger for paging a mobile station and (ii) in response to detecting the paging trigger, send a paging directive to the first base station to cause the first base station to page the mobile station. The first base station is arranged to begin broadcasting, in response to receiving the paging directive, a first series of page messages destined to the mobile station. In addition, the first base station is arranged to determine a load state of the control node. Further, the first base station is arranged to decide, responsive to the first base station receiving no response from the mobile station within a defined period after broadcasting the first series of page messages and responsive to the determined load state of the control node, whether to send a repeat-paging directive from the first base station to the second base station without routing the repeat-paging directive through the control node or rather to route the repeat-paging directive through the control node and then to the second base station. The repeat-paging directive causes the second base station to begin broadcasting a second series of page messages destined to the mobile station.

In accordance with a further aspect of the present disclosure a base station includes a communication interface through which the base station communicates with a second base station and a control node, wherein each base station is configured to radiate to define at least one respective wireless coverage area for serving mobile stations. The base station also includes a processor, data storage, and first paging logic stored in the data storage and executable by the processor to broadcast a first series of page messages destined to the mobile station in response to receiving a paging trigger sent from the control node. In addition, the base station includes load-state determining logic stored in the data storage and executable by the processor to determine a load state of the control node. Further, the base station includes second paging logic stored in the data storage and executable by the processor to decide, responsive to the base station receiving no response from the mobile station within a defined period after broadcasting the first series of page messages and responsive to the determined load state of the control node, whether to send a repeat-paging directive from the base station to the second base station without routing the repeat-paging directive through the control node or rather to route the repeat-paging directive through the control node and then to the second base station. The repeat-paging directive causes the second base station to begin broadcasting a second series of page messages destined to the mobile station.

These as well as other aspects, advantages, and alternatives will become apparent to those of ordinary skill in the art by reading the following detailed description, with reference where appropriate to the accompanying drawings. Further, it should be understood that the disclosure provided by this overview and the other description throughout this document is intended to illustrate the invention by way of example only and that numerous variations may be possible.

DETAILED DESCRIPTION

Figure 1:
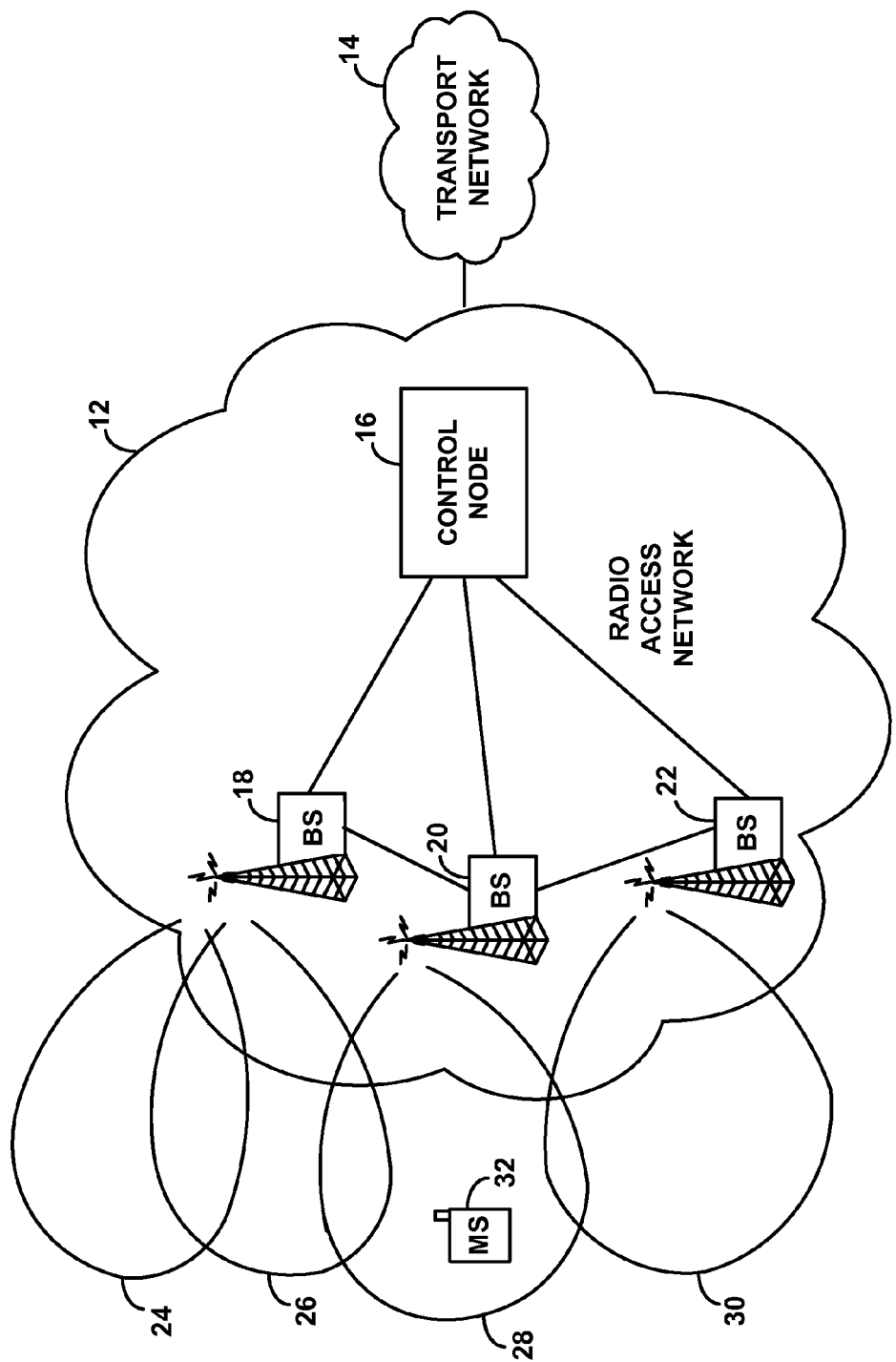
FIG. 1 is a block diagram of a cellular wireless communication system according to one embodiment of the present disclosure.

Referring to the drawings, FIG. 1 illustrates a cellular wireless communication system that includes a RAN 12, which functions to provide mobile stations with cellular wireless communication service, such as connectivity with a transport network 14 for instance. In general, the RAN includes a control node 16 and multiple base stations, three examples of which 18, 20, 22 are shown in FIG. 1.

Each base station may include transceiver equipment and antennas (e.g., on an antenna tower) arranged to define one or more cellular wireless coverage areas, such as a cell and cell sectors. For instance, base station 18 is shown radiating to define representative coverage areas 24, 26, base station 20 is shown radiating to define a representative coverage area 28, and base station 22 is shown radiating to define a representative coverage area 30. Shown operating within coverage area 28 is then a representative mobile station 32, which can be any type of wireless communication device capable of engaging in air interface communication with the base station.

The air interface of each coverage area may define various channels, including but not limited to at least one paging channel through which the base station can broadcast page messages destined for receipt by target mobile stations and at least one access channel through which mobile stations can send page response messages to the base stations. These channels may be defined in accordance with an agreed air interface communication protocol, such as one of those noted above for instance, and both the base station and the mobile station should be arranged to communicate in accordance with the agreed protocol. By way of example and without limitation, the channels may be defined in accordance with an LTE protocol.

In the present example, the control node 16 functions to manage certain aspects of the RAN operation, such as certain base station functions and features of air interface communication. As noted above, the control node can take various forms. For instance, the control node can be an MME that controls communications between mobile stations, the eNodeBs, and other components of the network.

Figure 2:
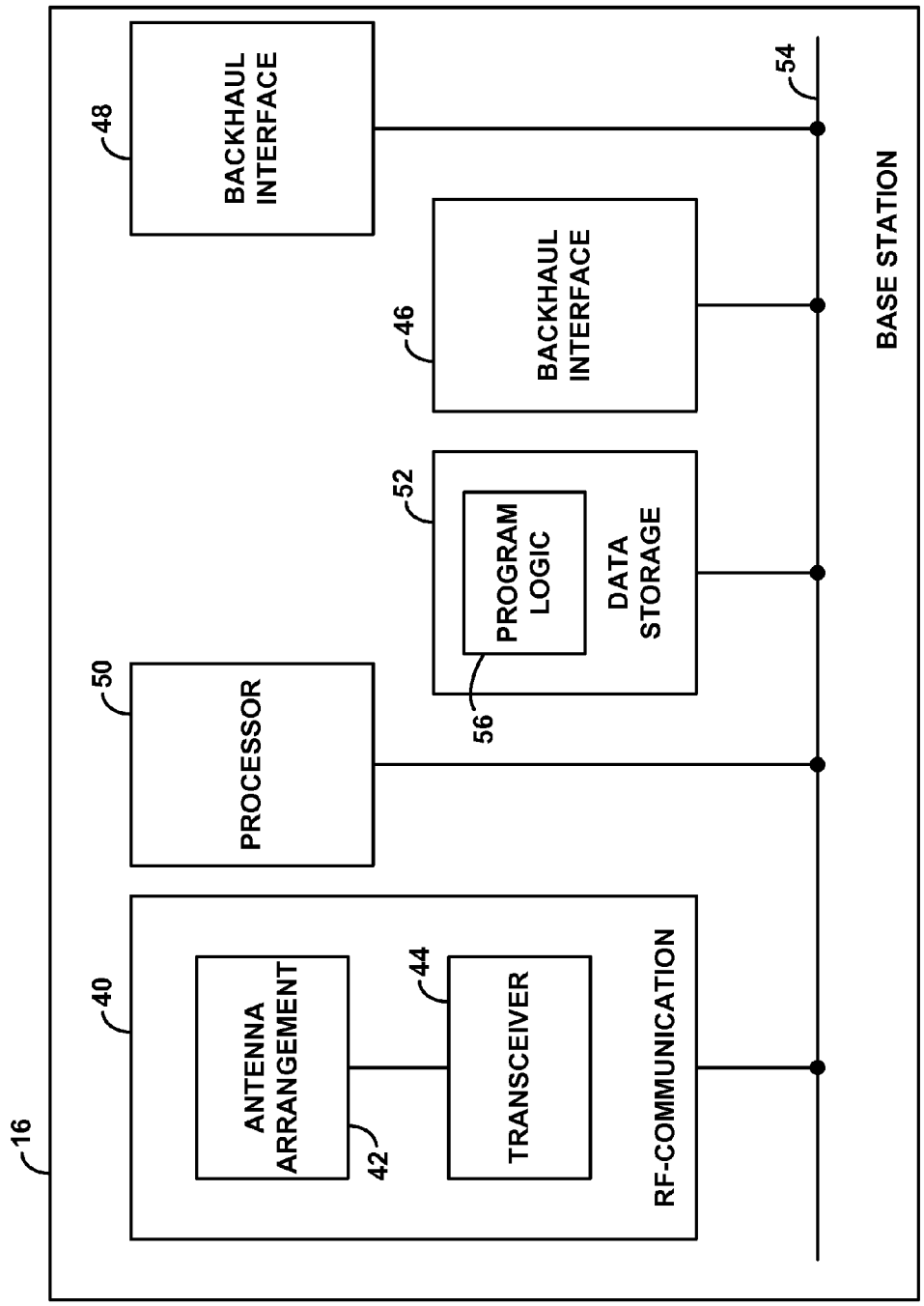
FIG. 2 is a block diagram of an example base station operable within the system of FIG. 1.

FIG. 2 is a block diagram of a base station, showing some of the functional components that each base station may include in the arrangement of FIG. 1. As shown, the base station includes for its one or more coverage areas an RF communication block 40 that includes a respective antenna arrangement 42 and transceiver 44, a first backhaul interface 46, a second backhaul interface 48, a processor 50, and non-transitory data storage 52, all of which may be communicatively linked together by a system bus, network, or other connection mechanism 54.

The antenna arrangement 42 may include one or more antennas arranged in a manner now known or later developed for radiating to define a wireless coverage area. Typically, the antenna arrangement would be mounted at the top of an antenna tower. But the antenna arrangement can be provided in some other manner or location (such as in a small scale femtocell, for instance). Transceiver 44, in turn, may comprise a power amplifier, modem chipset, channel cards, and other circuitry for sending and receiving communications via the antenna arrangement 42 in accordance with the agreed air interface protocol.

The first backhaul interface 46 comprises a mechanism for communicatively linking the base station with the control node 16, so as to facilitate communication of control signaling between the base station and the control node, for example. The control signaling between the base station and the control node can include exchange of control-node load information and information related to a communication or application type of the information that is needed to be transmitted to a mobile station. Thus, the first backhaul interface 46 may provide a first communication link interface between the base station and the control node.

The second backhaul interface 48 comprises a mechanism for communicatively linking the base station with other base stations, such as to facilitate communication of control signaling between the base station and other base stations. Thus, the second backhaul interface 48 may provide a second communication link interface between the base station and the one or more other base stations. The first and second communication links can be direct links or may include one or more intermediate nodes. For instance, under the LTE protocol, the control node can be an MME and the base stations can be eNodeBs. Further, the first communication link interface can be an S1 link interface and the second communication link interface can be an X2 link interface. In any event, the first and second backhaul interfaces 46, 48 may take whatever form is necessary to couple with the communication links to the control node and to other base stations.

The processor 50 may include one or more general purposes processors (e.g., INTEL microprocessors) and/or one or more special purpose processors (e.g., dedicated digital signal processors or application specific integrated circuits). If the processor comprises multiple processors, the processors may work separately or in combination (e.g. in parallel). Further, the functions of the processor 50 can be integrated in whole or in part with the transceiver 44 or with one or more other aspects of the base stations.

The data storage 52, in turn, may include one or more volatile and/or non-volatile storage components, such as magnetic, optical, or organic storage components, which can be integrated in whole or in part with the processor 50. As shown, the data storage 52 may contain program logic 56, which can be executed by the processor 50 to carry out certain base-station functions described herein, for example, the functions described in more detail with reference to FIG. 4. For instance, the program logic 56 may be executable to receive paging directives from the control node 16 and repeat-paging directives from other base stations, to responsively begin to broadcast page messages destined to a target mobile station, and to send repeat-paging directives to the control node or other base stations. Further, the program logic may also be executable upon receipt from the mobile station of a response to one of the page messages, to send to the control node a notification of the received response (e.g., the received response itself) and to send a paging-stop directive to other base stations to direct the other base stations to responsively discontinue broadcasting page messages.

Figure 3:
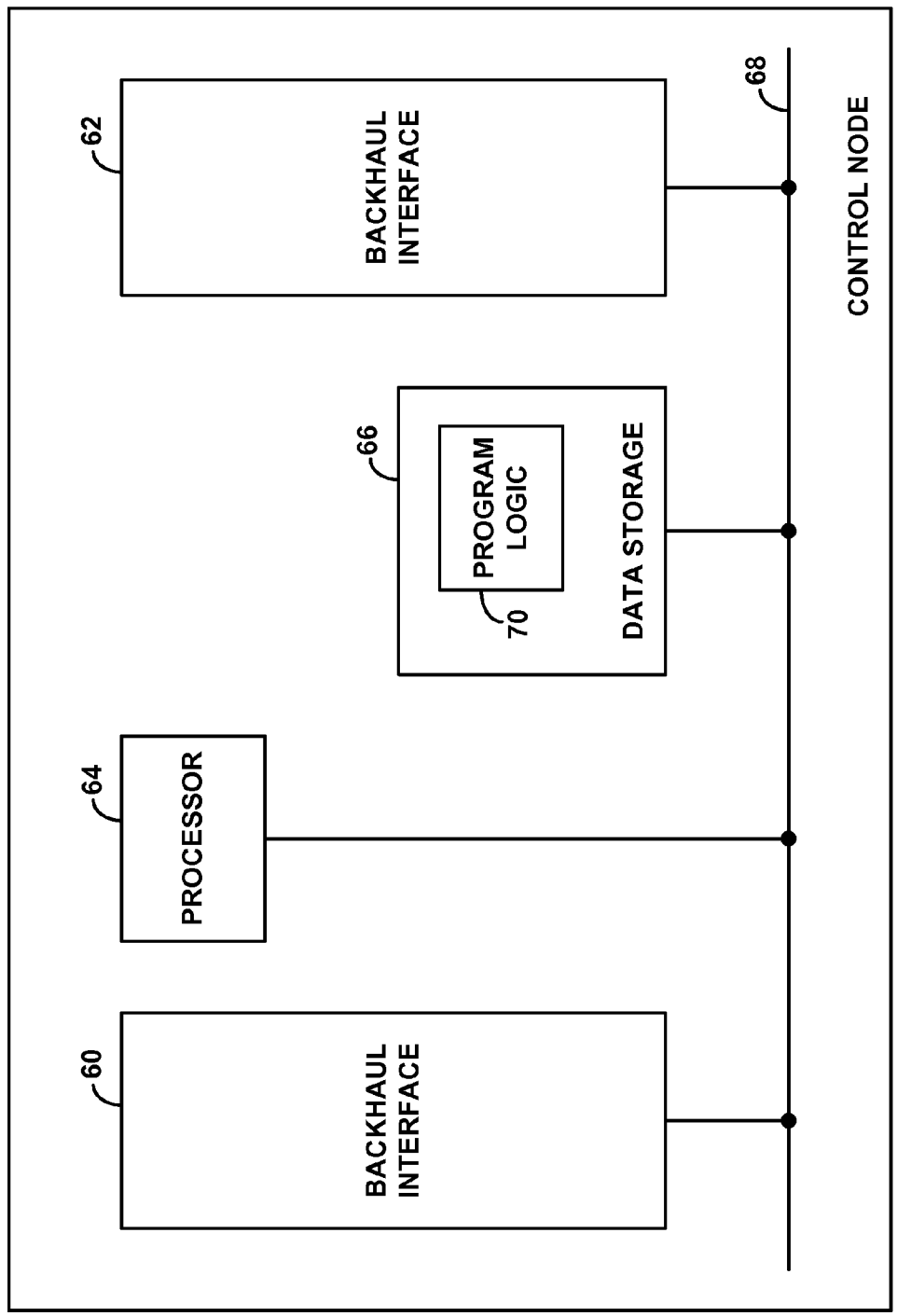
FIG. 3 is a block diagram of an example control node operable within the system of FIG. 1.

FIG. 3 is a block diagram of the control node 16, showing some of the functional components that the control node may include in the arrangement of FIG. 1. As shown, the control node may include a first backhaul interface 60, a second backhaul interface 62, a processor 64, and non-transitory data storage 66, all of which may be communicatively linked together by a system bus, network, or other connection mechanism 68.

The first backhaul interface 60 functions to provide direct or indirect connectivity with the various base stations and particularly with the backhaul interface 46 of each base station, so as to facilitate communication of control signaling between the control node and each base station. As discussed above, this control signaling between the control node and each base station can include control-node load information and information related to a communication or application type of the information that is needed to be transmitted to a mobile station. As with the base station backhaul interface 46, the first backhaul interface 60 of the control node may be arranged for wired and/or wireless backhaul communication and may take various forms depending on the links that connect the control node with each base station. For example, the first backhaul interface 60 may connect an MME with one or more S1 links to a plurality of eNodeBs.

The second backhaul interface 62 functions to provide connectivity with other RAN elements and/or with the transport network 14. For instance, if the control node is an MME, the second backhaul interface 62 may connect with a link to an S-GW or P-GW that in turn provide connectivity with the transport network. In another example, if the control node is a BSC, the second backhaul interface 62 may connect with a link to an MSC or PDSN that in turn provides connectivity with the transport network. Alternatively, if the control node is an MSC, the second backhaul interface 62 may simply provide connectivity with the PSTN. Other examples are possible as well.

As with the base-station processor 50, the control-node processor 64 may include one or more general purposes processors and/or one or more special purpose processors. The data storage 66, in turn, may include one or more volatile and/or non-volatile storage components, such as magnetic, optical, or organic storage components, which can be integrated in whole or in part with the processor 64. As shown, the data storage 66 may contain program logic 70, which can be executed by the processor 64 to carry out various control node functions described herein.

For instance, the program logic 70 may be executable to detect a trigger for paging the mobile station 32 and to responsively generate and send to one or more of the base stations 18, 20, 22 (defining a relevant paging zone for example) a paging directive that instructs the base stations to initiate paging of the mobile station. Further, the logic may be executable to receive from one of the base stations a notification that the base station received a page response from the mobile station, and to responsively establish a communication path with the mobile station.

Figure 4:
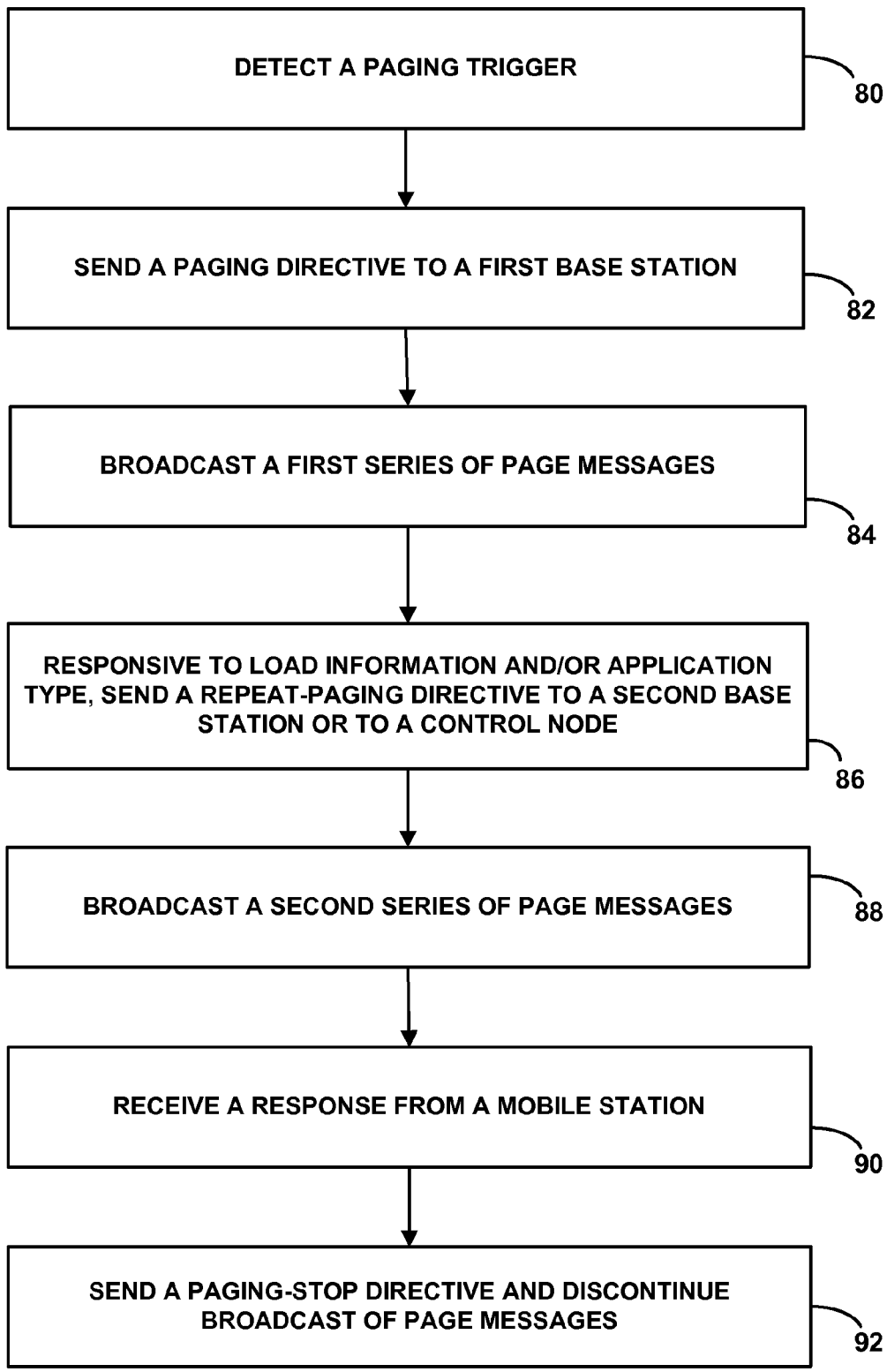
FIG. 4 is a flow chart depicting functions that can be carried out in accordance with an embodiment of the present disclosure.

FIG. 4 is a flow chart depicting functions that can be carried out in accordance with the present disclosure to control repeat-paging of mobile stations within a RAN, such as RAN 12. As shown in FIG. 4 and with further reference to FIGS. 1-3, at block 80, the method involves a control node, such as the control node 16, detecting a paging trigger for paging a mobile station, such as mobile station 32. Responsive to detecting the paging trigger, at block 82, the control node 16 sends a paging directive to a first base station, such as the base station 20 (or a first plurality of base stations). In response to receiving the paging directive, at block 84, the first base station 20 begins broadcasting a first series of page messages (e.g., page attempts) destined to the mobile station 32.

In an example, if the first base station 20 does not receive a response from the mobile station 32 to the first series of page messages within a defined period, at block 86, the first base station can form a repeat-paging directive. The first base station can decide whether to send the repeat-paging directive directly to a second base station, such as the base station 22, (or a second plurality of base stations) or to send the repeat-paging directive through the control node 16, which may then route the repeat-paging directive to one or more other base stations. To decide where to send the repeat-paging directive, the first base station 20 can consider load information of the control node 16 and/or an application type of the information to be sent to the mobile station 32.

In response to receiving the repeat-paging directive from the first base station 20 or the control node 16, at block 88, the second base station 22 begins wirelessly broadcasting a second series of page messages destined to the mobile station 32. At block 90, one of the base stations that is paging the mobile station 32 may then receive a response from the mobile station to a page message. Responsive to receiving the response from the mobile station, at block 92, the base station that received the response discontinues broadcasting page messages and sends a paging-stop directive to one or more of the other base stations and/or to the control node.

Referring back to block 80, the control node 16 detecting the paging trigger can take various forms. For instance, if the control node is an MME, detecting the paging trigger may involve receiving the paging trigger sent from an S-GW when data arrives at the S-GW for the mobile station or otherwise determining that communication with the mobile station is needed. Alternatively, if the RAN controller is an MSC, detecting the paging trigger may involve receiving a call setup signaling message indicating that a call is to be set up to the mobile station. Still alternatively, the function of detecting the paging trigger could involve simply determining that a next attempt at paging is required, such as after a first failed paging attempt or the like. Other examples are possible as well.

In one example, the control node 16 is an MME and the first base station 20 is an eNodeB and, at block 82, the MME sends the eNodeB the paging directive (e.g., a Paging Request message) through a link between the MME and the eNodeB, such as an S1 link. Such a directive may include data that informs the first base station 20 how many times the base station should page the mobile station and/or how much time the base station should wait between successive pages. Alternatively, each base station could have default settings (e.g., number of attempts and time interval between attempts) for such a paging directive, in which case the paging directive could include instructions to direct the base station to initiate the process with those settings.

At block 84, when the first base station 20 sends the page messages to the mobile station 32, the base station may optimally do so in timeslots that the mobile station is set to scan. For instance, if the mobile station 32 is set to operate at a slot cycle of 1.28 seconds, then the base station 20 may wait an interval of 1.28 seconds between successive page message transmissions to the mobile station, or the base station may wait an interval that is a multiple of 1.28 seconds (e.g., 2.56 seconds, 5.12 seconds, or 10.24 seconds) between successive page message transmissions to the mobile station. In an example, the first base station 20 and/or the control node 16 may receive a response from the mobile station 32. If the first base station 20 receives a response from the mobile station 32 to the page messages, the first base station can then discontinue broadcasting the page messages. The control node 16 can also receive the response, either directly from the mobile station 32 or through the first base station 20, and, in response to receiving the response, the control node can establish a communication path between the mobile station and the transport network.

However, as discussed above, if the first base station 20 does not receive a response from the mobile station 32 to the first series of page messages within a defined period, at block 86, the first base station can form a repeat-paging directive. The defined period may be defined, for example, by a length of time or a number of page messages sent from the first base station, which can be, in turn, defined by a length of time. At block 86, the first base station can decide whether to send the repeat-paging directive directly to the base station 22 or to send the repeat-paging directive through the control node 16, which may then route the repeat-paging directive to one or more other base stations. To decide where to send the repeat-paging directive, the first base station 20 can consider a load state or other load information of the control node 16.

More particularly, in an example embodiment, if the load information informs the first base station 20 that the control node 16 is currently experiencing a load that is high or above a determined threshold load level, the first base station can decide to route the repeat-paging directive to the second base station 22 without routing the repeat-paging directive through the control node. In a case where the control node 16 is currently experiencing a high load, the first base station 20 can beneficially avoid increasing the load of the control node with the repeat-paging directive.

However, in an example embodiment, if the load information informs the first base station 20 that the control node 16 is currently experiencing a load that is low or below the determined threshold load level, then increasing the load of the control node may not be a great concern and the first base station can proceed to route the repeat-paging directive through the control node. At block 86, the control node 16, in turn, can then route the repeat-paging directive to the second base station 22 (or the second plurality of base stations).

Generally, the threshold load level can be defined by any suitable parameters. For example, the threshold load level can be defined as a percentage of the control-node computational capacity. Thus, for instance, the threshold load level can be set to about 70% or more of the control-node computational capacity. In other examples, the threshold load level can be based on a paging capacity and/or signaling capacity associated with the control node. Illustratively, the threshold load level can be set to be about 70% or more of the paging or other signaling capacity associated with the control node. In other examples, the load level can be defined by one or more of the computational capacity, the paging or other signaling capacity, and/or other parameters. Other example threshold load levels are possible as well.

In one example, the control node 16 can send load information, such as a flag, to the first base station 20 (and perhaps other base stations managed by the control node), and the flag can inform the first base station that the load of the control node is currently high (e.g., above a threshold level). In one example, if the first base station 20 receives the flag from the control node 16, then the first base station will be informed that the load of the control node is high. On the other hand, in this example, if the first base station 20 does not receive the flag from the control node 16, the first base station will be informed that the load of the control node is low (e.g., below the threshold level).

In another example, the flag can inform the first base station 20 that the load of the control node 16 is currently low (e.g., below a threshold level) and, if the first base station does not receive the flag, the first base station will be informed that the load of the control node is high (e.g., above the threshold level). In this example, the control node 16 can avoid being burdened by sending the load information to the first base station 20 when the load of the control node is already high.

At block 86, the first base station 20 (and perhaps other base stations managed by the control node 16) can request the load information from the control node, and the control node can send the load information in response to the requests. Illustratively, the first base station 20 can request the load information from the control node 16, and if the first base station does not receive the load information from the control node within a defined period, the first base station can then be informed that the load of the control node is high (or low, depending on the nature of the load information).

In yet other examples, the control node 16 can send load information in another form that indicates the actual load level (as opposed to a high load flag or low load flag), and the first base station 20 can determine from this load information whether the load of the control node is high or low.

At block 86, the first base station 20 can also decide where to send the repeat-paging directive by considering an application type of the information to be sent to the mobile station 32. The application type of the information can, for example, be associated with a priority or latency level. For example, if the application type is associated with a lower latency (e.g., a latency below a threshold latency level, such as a level on the order of one second or less) or a higher priority (e.g., a priority above a threshold priority level), the first base station 20 can route the repeat-paging directive to the second base station 22 without routing the repeat-paging directive through the control node 16. In this case, routing the repeat-paging directive directly to the second base station 22 may beneficially result in a faster response from the mobile station. However, if the application type is associated with a higher latency (e.g., a latency above the threshold latency level) or a lower priority (e.g., a priority below the threshold priority level), the first base station 20 can route the repeat-paging directive through the control node 16.

Generally, the priority or latency level associated with an application type can be defined by any suitable parameters. For example, the priority and the latency level can be defined at least in part by relative quality-of-service guarantees associated with different applications. One non-limiting example of a generally higher-priority and lower-latency level application type is a push-to-talk (PTT) application, and one non-limiting example of a generally lower-priority and higher-latency level application type is a data-communication application. The priority or latency level can also be based, at least in part, on the type of device that caused the trigger event to be initiated. For example, a cellular phone that is attempting to establish a voice communication with another cellular phone can be associated with a higher priority or lower latency than a device configured for machine-to-machine communications, e.g., some automobiles, home appliances, environmental-sensor devices, etc., that is attempting to provide a data update to a cellular phone.

In one example, the control node can send the application type to one or more base stations at block 82. The control node can send the application type to a base station along with or separate from a paging directive sent by the control node. The control node can determine the application type by processing information from the device that is attempting to communicate with the mobile station.

In accordance with the example method of FIG. 4, the first base station 20 can determine whether to route the repeat-paging directive directly to the second base station 22 or to the control node 16 (i) in response to determining the load, (ii) in response to determining the application type, or (iii) in response to determining both the load and the application type.

If the first base station 20 decides to send the repeat-paging directive to the second base station 22, the first base station can send the repeat-paging directive directly to the second base station without the repeat-paging directive being routed through the control node. Illustratively, the first and second base stations can be eNodeBs and, at block 86, the first eNodeB sends the repeat-paging directive to the second eNodeB over an X2 link that communicatively couples and extends between the first and second eNodeBs. Alternatively, at block 82, the first base station 20 can decide to route the repeat-paging directive through the control node 16, such as an MME, which can then route the repeat-paging directive to other eNodeBs. In this case, the control node and the base stations can communicate over an S1 link interface.

Further, in the present example at block 86, the first base station 20 and/or the control node 16 may select the second base station 22 from a neighbor list that includes information relating to one or more other base stations that are arranged to radiate to define one or more wireless coverage areas neighboring a coverage area defined by the first base station. This neighbor list includes information that identifies neighboring base stations and connectivity information for establishing communications with the neighboring base stations. Generally, the neighbor list for a particular base station, in this example the first base station 20, includes information for other base stations that define coverage areas that are immediately neighboring or adjacent to the coverage area of the first base station. Although, the neighbor list for the first base station 20 may also include information for other base stations associated with wireless coverage areas that are nearby but not necessarily adjacent to the coverage area of the first base station.

In this example, at block 86, the first base station 20 and/or the control node 16 selects the second base station 22 (or plurality of second base stations) from the neighbor list of the first base station, and sends the repeat-paging directive to the second base station. In the case of the control node 16 selecting the second base station 22, the control node may be able to consider additional information that is not available to the first base station 20. For example, the control node 16 may consider neighbor lists of other base stations to select the second base station.

In another aspect of the flow chart of FIG. 4, the first base station 20 may perform (e.g., regularly or periodically in the background) a procedure to define or update the neighbor list discussed above. For example, under the LTE protocol, each eNodeB can perform an automatic neighbor relation (ANR) function to detect and add new neighbors to the neighbor list and to remove outdated neighbors from the neighbor list. This process of dynamically updating neighbor lists and selecting the second base station to receive repeat-paging directives facilitates the intelligent and more effective expansion of paging areas as compared to using static paging lists, for example.

As discussed above, responsive to receiving the repeat-paging directive from the first base station 20 or the control node 16, at block 88, the second base station 22 begins wirelessly broadcasting a second series of page messages destined to the mobile station 32. At this point, the first base station 20, the second base station 22, and/or other base stations may continue to broadcast page messages until a response is received from the mobile station 32.

Then, at block 90, one of the base stations may receive a response from the mobile station to a page message and, at block 92, the base station may discontinue broadcasting page messages and send a paging-stop directive to one or more of the other base stations and/or to the control node.

In response to receiving the paging-stop directive, the other base stations may then likewise discontinue broadcasting the page messages and/or the control node may discontinue sending instructions to base stations to broadcast page messages. In one example, the first and second base stations 20, 22 are eNodeBs and the paging-stop directive can be sent between the eNodeBs over an X2 link that extends between the base stations. In an example, after the first base station 20 sends the repeat-paging directive to the second base station 22, the first base station may receive a response from the mobile station 32. In response to receiving the mobile-station response, the first base station may then discontinue broadcasting page messages and send the paging-stop directive to the second base station.

An illustrative embodiment has been described above. It should be understood, however, that variations from the embodiment discussed are possible, while remaining within the true spirit and scope of the invention as claimed.

We claim:

1. A method for paging a mobile station in a cellular radio access network, the method comprising:
   wirelessly broadcasting from a first base station a first series of page messages destined to the mobile station, wherein broadcasting the first series of page messages is performed in response to the first base station receiving a paging directive from a control node;
   determining, by the first base station, a load state of the control node; and
   responsive to the first base station receiving no response from the mobile station within a defined period after broadcasting the first series of page messages and responsive to determining the load state of the control node, the first base station deciding whether to send a repeat-paging directive from the first base station to a second base station without routing the repeat-paging directive through the control node or rather to route the repeat-paging directive through the control node and then to the second base station, wherein the repeat-paging directive directs the second base station to wirelessly broadcast a second series of page messages destined to the mobile station.

2. The method of claim 1, further comprising the first base station determining whether the load state of the control node is above a threshold load level, and wherein, if the first base station determines that the load state is above the threshold load level, the first base station deciding to send the repeat-paging directive to the second base station without routing the repeat-paging directive through the control node, but, if the first base station determines that the load state is not above the threshold load level, the first base station deciding to route the repeat-paging directive through the control node and then to the second base station.

3. The method of claim 2, wherein determining the load state of the control node includes the first base station requesting the load state from the control node, wherein determining that the load state of the control node is not above the threshold load level includes, responsive to the request, the first base station receiving the load state from the control node within a second defined period, and wherein determining that the load state of the control node is above the threshold load level includes, responsive to the request, the first base station not receiving the load state from the control node within the second defined period.

4. The method of claim 1, further comprising the first base station receiving from the control node an indication of the load state.

5. The method of claim 1, further comprising determining, by the first base station, an application type associated with information to be sent to the mobile station in accordance with the paging directive.

6. The method of claim 5, wherein, responsive to the determined application type, the first base station deciding whether to send the repeat-paging directive from the first base station to the second base station without routing the repeat-paging directive through the control node or rather to route the repeat-paging directive through the control node and then to the second base station.

7. The method of claim 6, further comprising the first base station determining whether the application type is associated with a priority level above a threshold priority level, and wherein, if the first base station determines that the application type is associated with a priority level above the threshold priority level, the first base station deciding to send the repeat-paging directive to the second base station without routing the repeat-paging directive through the control node, and wherein, if the first base station determines that the application type is not associated with a priority level above the threshold priority level, the first base station deciding to route the repeat-paging directive through the control node and then to the second base station.

8. The method of claim 1, further comprising
detecting at the control node a paging trigger for paging the mobile station;
responsive to the control node detecting the paging trigger, sending the paging directive from the control node to the first base station; and
responsive to the second base station receiving the repeat-paging directive, wirelessly broadcasting from the second base station the second series of page messages destined to the mobile station.

9. The method of claim 1, wherein each base station is arranged to radiate to define at least one respective wireless coverage area for serving mobile stations, and wherein the method further comprises: the first base station dynamically updating a neighbor list that includes information relating to one or more other base stations that are arranged to radiate to define one or more wireless coverage areas neighboring a coverage area defined by the first base station; and the first base station or the control node selecting, from the neighbor list, the second base station to which the first base station sends the repeat-paging directive.

10. A paging system comprising:
a control node;
a first base station; and
a second base station, wherein each base station is configured to radiate to define at least one respective wireless coverage area for serving mobile stations,
wherein the control node, the first base station, and the second base station are communicatively linked with each other,
wherein the control node is configured to (i) detect a paging trigger for paging a mobile station and (ii) in response to detecting the paging trigger, send a paging directive to the first base station to cause the first base station to page the mobile station,
wherein the first base station is arranged to begin broadcasting, in response to receiving the paging directive, a first series of page messages destined to the mobile station,
wherein the first base station is arranged to determine a load state of the control node, and
wherein the first base station is arranged to decide, responsive to the first base station receiving no response from the mobile station within a defined period after broadcasting the first series of page messages and responsive to the determined load state of the control node, whether to send a repeat-paging directive from the first base station to the second base station without routing the repeat-paging directive through the control node or rather to route the repeat-paging directive through the control node and then to the second base station, and
wherein the repeat-paging directive causes the second base station to begin broadcasting a second series of page messages destined to the mobile station.

11. The paging system of claim 10, wherein the first base station is arranged, responsive to the first base station determining that the load state of the control node is above a threshold load level, to decide to send the repeat-paging directive to the second base station without routing the repeat-paging directive through the control node, and wherein the first base station is further arranged, responsive to the first base station determining that the load state of the control node is below the threshold load level, to decide to route the repeat-paging directive through the control node and then to the second base station.

12. The paging system of claim 11, wherein the first base station is arranged to determine the load state of the control node by the first base station requesting the load state from the control node, wherein the first base station is arranged to determine that the load state of the control node is below the threshold includes when, responsive to the request, the first base station receives the load state from the control node within a second defined period, and wherein the first base station is arranged to determine that the load state of the control node is above the threshold includes when, responsive to the request, the first base station does not receive the load state from the control node within the second defined period.

13. The paging system of claim 11, wherein the first base station is arranged to determine an application type associated with information to be sent to the mobile station in accordance with the paging directive, and wherein the first base station is arranged, responsive to the determined application type, to decide whether to send the repeat-paging directive from the first base station to the second base station without routing the repeat-paging directive through the control node or to route the repeat-paging directive through the control node and then to the second base station.

14. The paging system of claim 11, wherein the first base station is arranged, responsive to the first base station determining that the application type is associated with a priority level above a threshold priority level, to decide to send the repeat-paging directive to the second base station without routing the repeat-paging directive through the control node, and wherein the first base station is arranged, responsive to the first base station determining that the application type is associated with a priority level below the threshold priority level, to decide to route the repeat-paging directive through the control node and then to the second base station.

15. The paging system of claim 11, wherein the first base station is arranged to discontinue broadcasting the first series of page messages in response to the first base station receiving at least one of a response from the mobile station to one of the page messages or a paging-stop directive from the second base station, and wherein the second base station is arranged to discontinue broadcasting the second series of page messages in response to the second base station receiving at least one of a response from the mobile station to one of the page messages or a paging-stop directive from the first base station.

16. A base station comprising:
a communication interface through which the base station (first base station) communicates with a second base station and a control node, wherein each base station is configured to radiate to define at least one respective wireless coverage area for serving mobile stations;
a processor;
data storage;
first paging logic stored in the data storage and executable by the processor to broadcast a first series of page messages destined to the mobile station in response to receiving a paging trigger sent from the control node;

load-state determining logic stored in the data storage and executable by the processor to determine a load state of the control node; and second paging logic stored in the data storage and executable by the processor to decide, responsive to the first base station receiving no response from the mobile station within a defined period after broadcasting the first series of page messages and responsive to the determined load state of the control node, whether to send a repeat-paging directive from the first base station to the second base station without routing the repeat-paging directive through the control node or rather to route the repeat-paging directive through the control node and then to the second base station, and wherein the repeat-paging directive causes the second base station to begin broadcasting a second series of page messages destined to the mobile station.

17. The base station of claim 16, wherein the second paging logic is executable to send, responsive to the first base station determining that the load state of the control node is above a threshold load level, the repeat-paging directive to the second base station without routing the repeat-paging directive through the control node, and wherein the second paging logic is executable to route, responsive to the first base station determining that the load state of the control node is below the threshold load level, the repeat-paging directive through the control node and then to the second base station.

18. The base station of claim 17, wherein the load state determining logic is executable to determine the load state of the control node by causing the first base station to request the load state from the control node, wherein the second paging logic is executable to determine that the load state of the control node is below the threshold load level includes when, responsive to the request, the first base station receives the load state from the control node within a second defined period, and wherein the second paging logic is executable to determine that the load state of the control node is above the threshold load level when, responsive to the request, the first base station does not receive the load state from the control node within the second defined period.

19. The base station of claim 16, further comprising application-type determining logic stored in the data storage and executable by the processor to determine an application type associated with information to be sent to the mobile station in accordance with the paging directive, and wherein the second paging logic is executable to decide, responsive to the determined application type, whether to send the repeat-paging directive from the first base station to the second base station without routing the repeat-paging directive through the control node or rather to route the repeat-paging directive through the control node and then to the second base station.

20. The base station of claim 19, wherein the second paging logic is executable to send, responsive to the first base station determining that the application type is associated with a priority level above a threshold priority level, the repeat-paging directive to the second base station without routing the repeat-paging directive through the control node, and wherein the second paging logic is executable to route, responsive to the first base station determining that the application type is associated with a priority level below the threshold priority level, the repeat-paging directive through the control node and then to the second base station.

* * * * *